United States Patent
Pamminger et al.

(10) Patent No.: US 9,387,917 B2
(45) Date of Patent: Jul. 12, 2016

(54) DECOMPRESSION UNIT

(75) Inventors: Erich Pamminger, Weilbach (AT); Bernhard Kammerer, Zell an der Pram (AT)

(73) Assignee: Facc AG, Ried im Innkreis (AT)

( * ) Notice: Subject to any disclaimer, the term of this patent is extended or adjusted under 35 U.S.C. 154(b) by 559 days.

(21) Appl. No.: 13/880,201

(22) PCT Filed: Oct. 13, 2011

(86) PCT No.: PCT/AT2011/000426
§ 371 (c)(1),
(2), (4) Date: Apr. 18, 2013

(87) PCT Pub. No.: WO2012/051634
PCT Pub. Date: Apr. 26, 2012

(65) Prior Publication Data
US 2013/0206909 A1    Aug. 15, 2013

(30) Foreign Application Priority Data

Oct. 19, 2010 (AT) .................................. 1738/2010

(51) Int. Cl.
*B64C 1/00* (2006.01)
*B64C 1/14* (2006.01)
*B64C 1/10* (2006.01)

(52) U.S. Cl.
CPC ... *B64C 1/00* (2013.01); *B64C 1/10* (2013.01); *B64C 2001/009* (2013.01)

(58) Field of Classification Search
CPC .... B65D 90/36; B64D 2045/005; B64C 1/32; B64C 2001/009; B64C 1/1469
See application file for complete search history.

(56) References Cited

U.S. PATENT DOCUMENTS

| | | | |
|---|---|---|---|
| 3,332,175 A | 7/1967 | Hawes et al. | |
| 5,461,831 A | 10/1995 | Michal | |
| 5,606,829 A | 3/1997 | Hararat-Tehrani | |
| 6,029,933 A | 2/2000 | Holman et al. | |
| 6,813,898 B2 * | 11/2004 | Lindsay | B64D 9/00 62/228.4 |
| 8,726,588 B2 | 5/2014 | Jakus et al. | |
| 2007/0234655 A1 | 10/2007 | Jakus et al. | |
| 2009/0159748 A1 | 6/2009 | Treimer et al. | |
| 2010/0096500 A1 | 4/2010 | Benthien | |

FOREIGN PATENT DOCUMENTS

| | | |
|---|---|---|
| CN | 2212119 Y | 11/1995 |
| CN | 1215681 A | 5/1999 |
| CN | 101405463 A | 4/2009 |
| DE | 42 16 277 A1 | 11/1993 |

(Continued)

*Primary Examiner* — Brian M O'Hara
(74) *Attorney, Agent, or Firm* — Laurence A. Greenberg; Werner H. Stemer; Ralph E. Locher

(57) ABSTRACT

A decompression unit is suitable for use in a decompression opening of a wall element of an aircraft. The unit includes a panel which can be mounted via a frame in or over the decompression opening. The panel can be moved out of the frame at a predetermined differential pressure Δp in order to open the decompression opening. In order to form a decompression unit of as simple a design as possible and with an optimum response behavior, the panel is formed by at least one hardened prepreg layer with at least one separating joint that is filled with cured resin as a predetermined breaking point. The separating joint breaks when the predetermined differential pressure is exceeded.

11 Claims, 3 Drawing Sheets

(56) References Cited

FOREIGN PATENT DOCUMENTS

| DE | 44 03 896 C1 | 9/1995 |
| DE | 10 2007 011 627 A1 | 7/2008 |
| EP | 0 894 709 A2 | 2/1999 |
| WO | 2007/112147 A2 | 10/2007 |

* cited by examiner

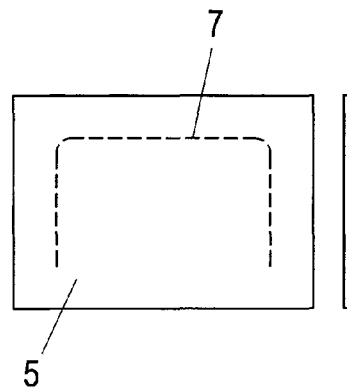
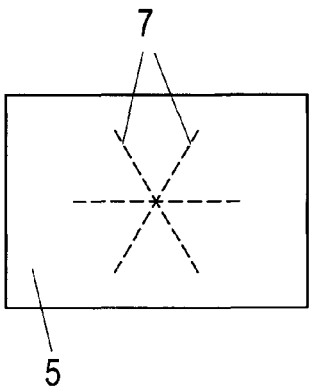
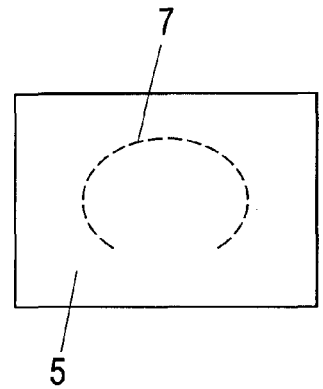
FIG. 5A  FIG. 5B  FIG. 5C
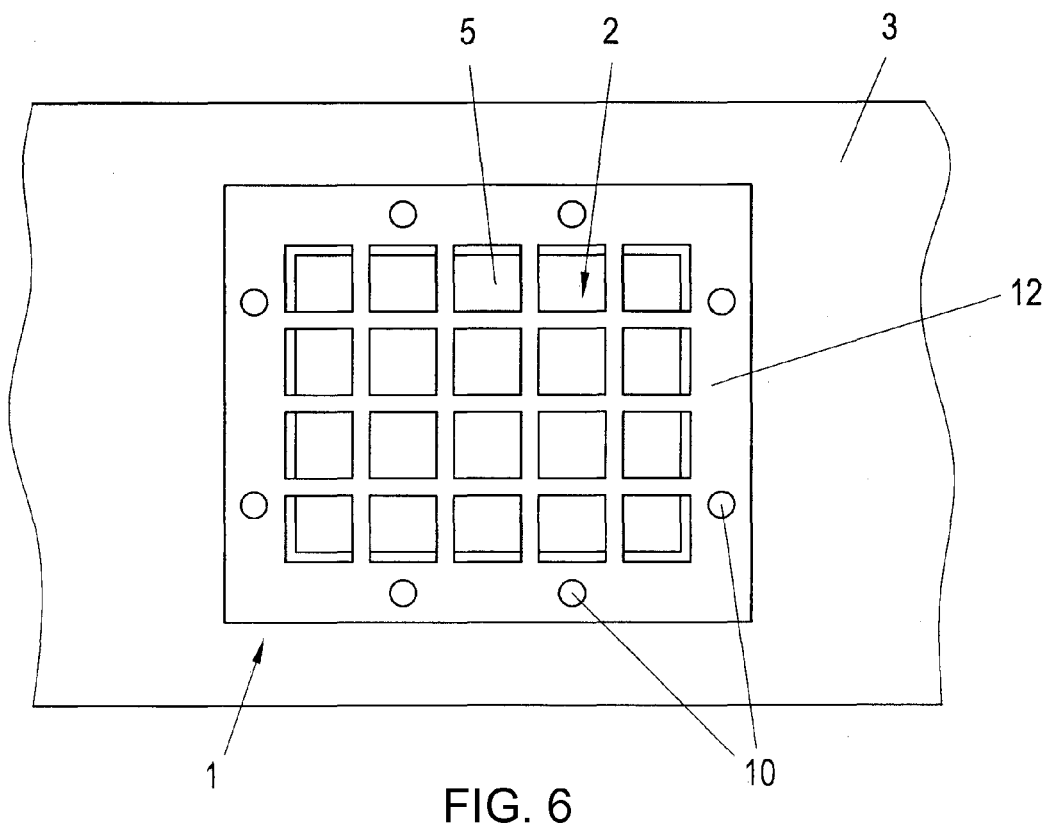
FIG. 6

DECOMPRESSION UNIT

BACKGROUND OF THE INVENTION

Field of the Invention

The invention relates to a decompression unit for use in a decompression opening of a wall element of an aircraft, having a panel, which can be mounted via a frame in or over the decompression opening, which panel can be moved out of the frame at a predetermined differential pressure in order to open the decompression opening.

During the flight of an aircraft, pressure in the cabin is increased in order to create normal environmental conditions for the passengers and the crew of the aircraft in common altitudes of flight. According to this, the internal pressure of an aircraft is increased in relation to its surroundings, so the cabin is designed in the form of a pressurised cabin. Appropriate outlet valves are provided for regulating pressure in the cabin of an aircraft.

Most aircraft comprise several sections that are divided by appropriate wall elements. For example, the passenger cabin of a passenger plane is separated from the cargo compartment accordingly. In this context, the term wall element is meant to include substantially vertically arranged elements as well as substantially horizontally arranged floor elements and ceiling elements. In the separating walls between such sections, decompression units have to be arranged, opening on both sides of the wall elements to enable a pressure compensation whenever a predetermined differential pressure between the sections is exceeded. For example, a hole in the exterior shell of the aircraft may cause a respective negative pressure in the cargo compartment, which might lead to the differential pressure between the passenger cabin and the cargo compartment rising to an unacceptable high value and to the wall elements being destroyed. In such a case, the decompression panels trigger, opening corresponding decompression openings in the wall elements in order to effect a quick pressure compensation between the sections. Such decompression panels (blow-out panels) need to trigger as quick as possible when a predetermined differential pressure is exceeded. Decompression panels for aircraft are known in a great variety of embodiments.

For example, a decompression panel in which the decompression openings are covered by spring-supported panels is described in U.S. Pat. No. 5,871,178 A. When a particular differential pressure is exceeded, the spring force of the attachment elements is overcome and the panel is moved out of the opening. A drawback here is that the spring force which has to be overcome cannot be explicitly defined.

A similar decompression panel for separating walls and/or separating floors of aircraft is described in EP 291,661 B1, being held within the decompression opening by evenly distributed holding and clamping devices. The holding springs comprise breaking points, which break when a predetermined differential pressure is exceeded. This construction is relatively complex in design as well, and does not guarantee short triggering time.

BRIEF SUMMARY OF THE INVENTION

It is the object of the present invention to create a decompression unit as mentioned above, which is designed as simple and cost-efficient as possible, and which triggers in the most swift and reliable way when a predetermined differential pressure is exceeded. Drawbacks of known systems should be avoided or at least reduced.

The object according to the invention is achieved by the panel being formed by at least one hardened prepreg layer with at least one separating joint, which is filled with cured resin, as a predetermined breaking point, which separating joint breaks when the predetermined differential pressure is exceeded. The decompression unit according to the invention is characterised by a construction which may be manufactured particularly simple and cost-efficient and guarantees triggering in a particularly short time. During manufacture, one or more prepreg layers are severed in non-cured state along a contour to be freely defined before being cured via common procedures in an autoclave. This leads to the created separating joint being automatically filled by the resin contained in the prepreg. The cured resin in the separating joint thus forms the predetermined breaking point that breaks when the differential pressure is exceeded. By choosing the width of the separating joint and the height of the separating joint and/or the number of prepreg layers accordingly, the differential pressure at which the predetermined breaking point breaks may be set relatively accurately and reliably. The width of the separating joint in relation to the triggering method is not very important here; the only relevant factor is that the fibres of the prepreg layer, in particular the glass fibres of a glass-fibre prepreg layer, are severed during the production of the separating joint. The pathway of the separating joint may be adapted to the respective geometrical conditions. The decompression unit according to the invention is further characterised by a very low mass of the panel in order to guarantee a very short triggering time. Furthermore, the visible side of the decompression unit may be adapted to match the common interior of an aircraft cabin easily.

According to a feature of the invention the separating joint within the panel may be self-contained. This guarantees a secure uncovering of the decompression opening when the differential pressure is exceeded. Alternatively, the separating joint might, of course, not be self-contained as well, so the panel is not pulled out of the decompression opening in its entirety when the decompression unit triggers, but is opened accordingly. Choosing the size of the decompression opening wisely guarantees that the amount of air needed for the pressure compensation may move from one side of the wall element to the other side of the wall element as quick as possible.

By arranging a plastic film on at least one side of the at least one prepreg layer, the production of the panel may be facilitated since the plastic film acts as a carrier material, thus facilitating transport of the panel into the autoclave for curing. Moreover, the plastic film provides an ideal visual appearance for the panel. A film made of polyvinyl fluoride, available under the trade name Tedlar® by company DuPont, for example, has proven particularly useful for this purpose. This polymer film is already being used for coating panels in aircraft and is characterised by a very low thickness and high resistance.

In order to guarantee the tightness of the decompression unit in non-triggered state, it is advantageously for a strip of an elastic material, in particular foam, to be arranged on the side of the panel facing the wall element. This foam strip provides for an appropriate sealing of the decompression opening.

In order to meet fire regulations and achieve the required impermeability to smoke as well, an additional fire protection strip made of a flame-retardant material may be arranged on the side of the panel facing the wall element. Such a fire protection strip made of a flame-retardant material may be used in addition to or instead of the foam strip mentioned above. An intumescent fire stopping laminate based on graphite, as it is already being used for fireproof doors, is particularly suitable here. A fire stopping laminate of this type is available, for example, under the brand name Intumex® L.

For connecting the frame of the decompression unit to the wall element of the aircraft, respective connecting elements may be provided.

If the connecting elements are formed by screws, bolts or the like, it is relatively simple to replace the decompression unit.

Should the frame be glued to the decompression unit in addition to or instead of screws or bolts, replacing the decompression unit is no longer possible in such an easy way or at all.

In order to prevent the panel or parts of the panel from moving out of the decompression opening in an uncontrolled manner when the differential pressure is exceeded, at least one element for securing the panel may be provided. Such a securing element is particularly relevant with a self-contained separating joint so the panel remains secured to the wall element when the decompression unit triggers.

In the most simple case, such securing elements may be formed by ropes, which are arranged between the frame of the decompression unit or the wall element and the panel. One end of the rope may be connected to the connecting elements on the frame, for example, whereas the other free end of the rope may be glued to the panel.

To avoid an undesired breaking of the separating joint of the panel by mechanical impact from one side of the decompression unit, a protective grid, which is connectible to the frame, may be arranged on said side. This protective grid prevents the panel from being pushed out of the decompression opening by hand or by foot, releasing the decompression opening even though the differential pressure is not exceeded. Preferably, the protective grid is made of a grid manufactured from at least one prepreg layer.

If the separating joint has a width of 0.1 to 0.8 mm, a sure severing of the fibres of the prepreg layer is guaranteed, so the separating joint may be manufactured easily by conventional techniques.

The invention will be discussed in more detail by means of the attached figures.

In the figures:

BRIEF DESCRIPTION OF THE SEVERAL VIEWS OF THE DRAWING

FIGS. 5a to 5c show different arrangements of a sectional joint in the panel of the decompression unit; and FIG. 6 shows a further embodiment of a decompression unit with a protective grid arranged thereon.

DESCRIPTION OF THE INVENTION

Figure 1:
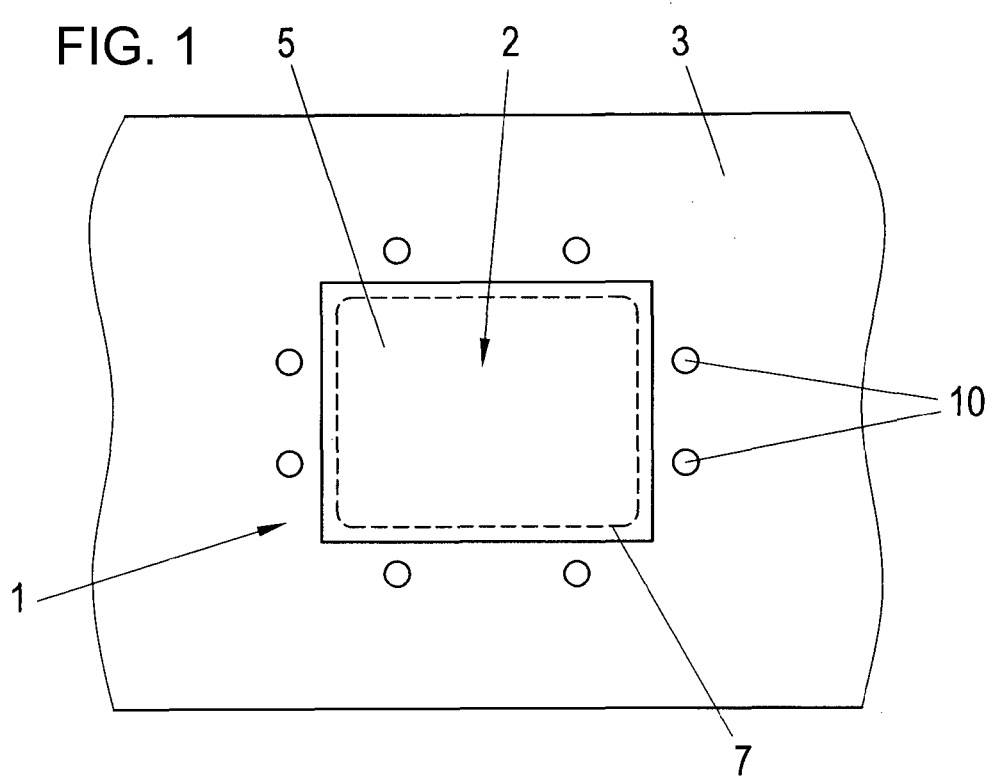
FIG. 1 shows a view of a wall element of an aircraft with a decompression opening and a decompression unit arranged therein according to the present invention.

FIG. 1 shows a view of a decompression unit 1 in a decompression opening 2 of a wall element 3 in an aircraft. According to this, decompression opening 2 in wall element 3 is covered by a panel 5, which panel 5 is formed by at least one hardened prepreg layer 6 with at least one separating joint 7, which is filled with cured resin, as a predetermined breaking point (see FIGS. 4a and 4b). Separating joint 7 in panel 5 guarantees that the fibres of the prepreg layer, glass fibres in particular, are severed, thus forming a predetermined breaking point, which is filled by cured resin only. In case of the predetermined differential pressure Δp being exceeded, the brittle resin in separating joint 7 breaks, and panel 5 moves out of decompression opening 2 in order to effect a pressure compensation between both sides of wall element 3.

Figure 2:
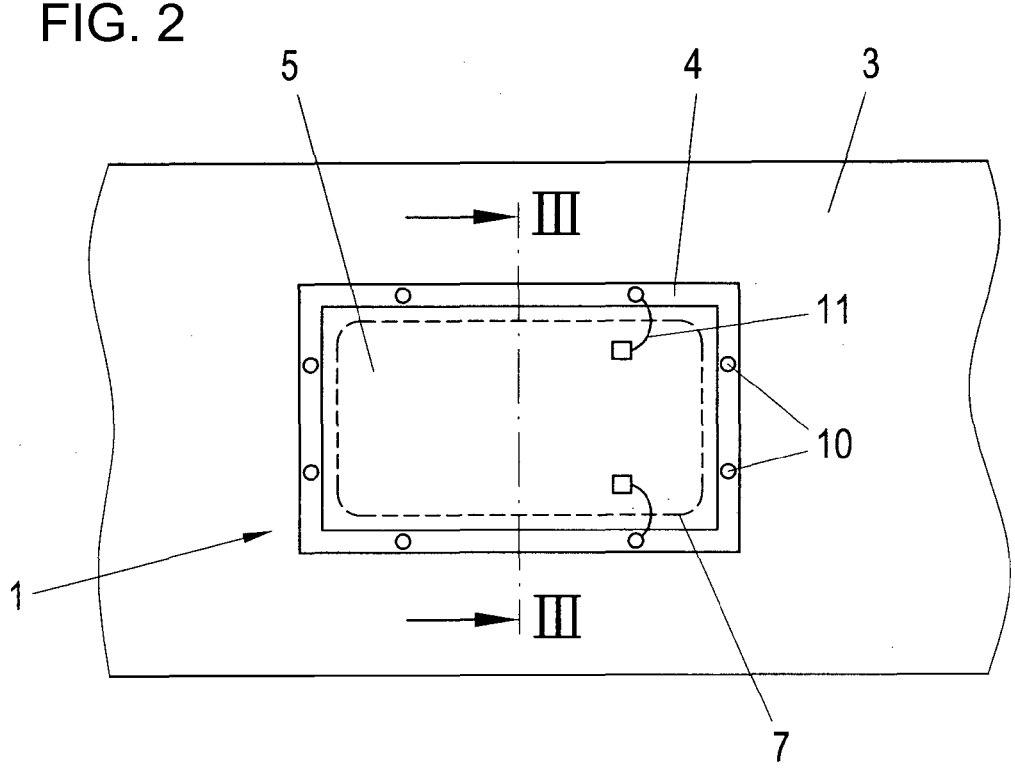
FIG. 2 shows a view of wall element 3 according to FIG. 1 from the opposite side.

FIG. 2 shows a rear view of decompression unit 1 according to FIG. 1. Here, panel 5 is connected to wall element 3 via a frame 4. Appropriate connecting elements 10, which may be formed by screws, bolts or the like, may be used for connecting. If separating joint 7 is continuous and self-contained, panel 5 will be moved out of decompression opening 2 in its entirety in case of a decompression occurring. In order to secure panel 5 accordingly when triggered, securing elements 11 may be provided. These securing elements 11 may be formed by ropes, for example, which are attached between connecting elements 10 on frame 4 and panel 5.

Figure 3:
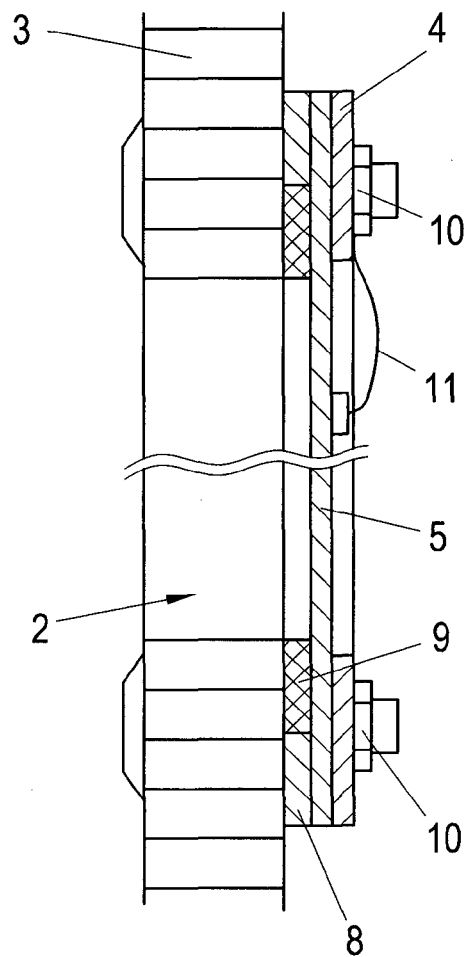
FIG. 3 shows a sectional view of wall element 3 according to FIG. 2 along section line III-III.

The sectional view according to FIG. 3 shows wall element 3 and panel 5, which is arranged within wall element 3 via a strip 8 of an elastic material, in particular foam, in the illustrated example. Moreover, a fire protection strip 9 made of a flame-retardant material may be arranged to ensure meeting required fire regulations and achieving impermeability to smoke.

Figure 4A:
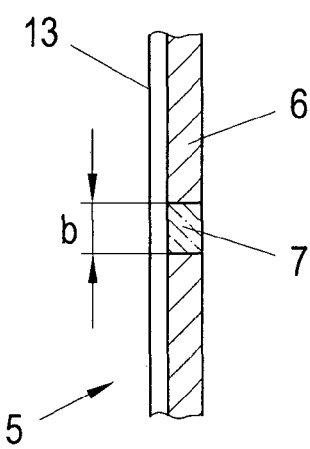
FIGS. 4a and 4b show sectional views of two different embodiments of panels of decompression units according to the invention.
Figure 4B:
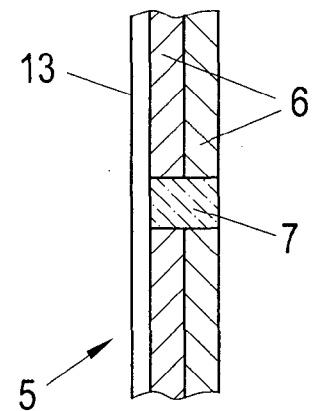

FIGS. 4a and 4b show two embodiments of a panel 5 for forming decompression unit 1 according to the invention. In the exemplary embodiment according to FIG. 4a, panel 5 is comprised of a prepreg layer 6 with separating joint 7, which is filled by resin. A plastic film 13, in particular a film made of polyvinyl fluoride, is arranged on one side of prepreg layer 6 of panel 5. This plastic film 13 may be used as a carrier material and provides a desired visual appearance for panel 5. Width b of separating joint 7 is selected according to the manufacturing method of separating joint 7, and is preferably between 0.1 and 0.8 mm.

If two or more prepreg layers 6 instead of one prepreg layer are used for building panel 5, according to FIG. 4b, separating joint 7 becomes correspondingly taller, which has an effect on the response behaviour of decompression unit 1. Arranging multiple prepreg layers 6 on top of each other may thus be used to adjust pressure difference Δp for triggering the decompression panel accordingly. Arranging multiple prepreg layers 6 in this way will guarantee that decompression unit 1 does not trigger when pressure difference Δp is too low.

FIGS. 5a to 5c show different ways for arranging a self-contained separating joint 7. In the embodiment according to FIG. 5a, the separating joint is arranged over three sides of a rectangle, so panel 5 is opened in case of a decompression. In the embodiment according to FIG. 5b, three separating joints 7 are arranged in a star-type pattern, whereas in FIG. 5c separating joint 7 is arranged in the shape of a circular and/or elliptical sector. The respective design of separating joint 7 may be easily adapted to the respective spatial conditions.

Finally, FIG. 6 shows a view of a decompression unit 1 in which a protective grid 12 is arranged over decompression opening 2, preventing an accidental breaking of separating joint 7 of panel 5 due to mechanical impact. Preferably, protective grid 12 is formed by at least one prepreg layer as well. Alternatively, embodiments comprised of metal bars or plastic bars are conceivable as well, of course.

The invention claimed is:

1. A decompression unit for a decompression opening of a wall element of an aircraft, the decompression unit comprising:
a frame;
a panel disposed in said frame and mounted via said frame in or on the decompression opening,
said panel being formed of at least one hardened prepreg layer, said panel including:
a prepreg layer inner region;
a prepreg layer outer region which completely surrounds the inner region;
a continuous separating joint located between said inner region and said outer region, said separating joint being filled with cured resin, said separating joint breaking when a predetermined differential pressure is exceeded resulting in an entirety of said inner region moving out of said decompression opening; and
a fire protection strip of a flame-retardant material disposed on a side of said panel facing the wall element.

2. The decompression unit according to claim 1, which comprises a plastic film disposed on at least one side of said at least one prepreg layer.

3. The decompression unit according to claim 2, wherein said plastic film is a polyvinyl fluoride film.

4. The decompression unit according to claim 1, which comprises a strip of an elastic material disposed on a side of said panel facing the wall element.

5. The decompression unit according to claim 4, wherein said strip of elastic material is a strip of foam.

6. The decompression unit according to claim 1, which comprises connection elements disposed on said frame for connecting said frame to said wall element.

7. The decompression unit according to claim 6, wherein said connection elements are screws or bolts.

8. The decompression unit according to claim 1, which comprises at least one securing element for securing said inner region being pushed out of the decompression opening in case the predetermined pressure difference is exceeded.

9. The decompression unit according to claim 8, wherein said securing element is a rope.

10. The decompression unit according to claim 1, which comprises a protective grid connected to said frame and disposed on at least one side of said panel.

11. The decompression unit according to claim 1, wherein said separating joint has a width of between 0.1 and 0.8 mm.

* * * * *